(12) United States Patent
Noh et al.

(10) Patent No.: US 7,916,696 B2
(45) Date of Patent: Mar. 29, 2011

(54) TRAFFIC HANDOVER CONTROL DEVICE AND METHOD OF MULTI-MODE MOBILE COMMUNICATION TERMINAL

(75) Inventors: Jeong-Min Noh, Seoul (KR); Ji-Hoon Park, Seongnam-si (KR); Choon-Seop Kim, Anyang-si (KR)

(73) Assignee: Samsung Electronics Co., Ltd (KR)

( * ) Notice: Subject to any disclaimer, the term of this patent is extended or adjusted under 35 U.S.C. 154(b) by 579 days.

(21) Appl. No.: 11/405,094

(22) Filed: Apr. 17, 2006

(65) Prior Publication Data

US 2006/0233136 A1 Oct. 19, 2006

(30) Foreign Application Priority Data

Apr. 19, 2005 (KR) .................. 10-2005-0032532

(51) Int. Cl.
*H04W 4/00* (2009.01)
(52) U.S. Cl. ..... 370/331; 455/436; 455/442; 455/127.4; 455/552.1
(58) Field of Classification Search .................. 370/331; 455/550.1, 551, 552.1, 553.1, 554.1, 554.2, 455/555, 556.1, 556.2, 557, 558, 559, 560, 436, 437, 438, 439, 440, 441, 442, 443, 444, 331, 332, 333, 334, 127.4
See application file for complete search history.

(56) References Cited

U.S. PATENT DOCUMENTS

| | | | | |
|---|---|---|---|---|
| 5,371,874 | A  * | 12/1994 | Chinnaswamy et al. | 711/141 |
| 7,646,737 | B2 * | 1/2010 | Shi | 370/310 |
| 2006/0224831 | A1 * | 10/2006 | Yoshikawa | 711/137 |

* cited by examiner

*Primary Examiner* — Patrick N Edouard
*Assistant Examiner* — Aung Win
(74) *Attorney, Agent, or Firm* — The Farrell Law Firm, P.C.

(57) ABSTRACT

Provided is a handover control device and method of a multi-mode mobile communication terminal. The device includes a first processing module; a second processing module connected in its inter-chip path with the first processing module; and an application processor for controlling the first processing module to transmit an IMSI (international mobile subscriber identity) to the second processing module when a traffic handover event from a first mode to a second mode occurs.

9 Claims, 7 Drawing Sheets

FIG.1

"PRIOR ART"

TRAFFIC HANDOVER CONTROL DEVICE AND METHOD OF MULTI-MODE MOBILE COMMUNICATION TERMINAL

PRIORITY

This application claims priority under 35 U.S.C. §119 to an application entitled "Traffic Handover Control Device and Method of Multi-mode Mobile Communication Terminal" filed in the Korean Intellectual Property Office on Apr. 19, 2005 and assigned Serial No. 2005-32532, the contents of which are incorporated herein by reference.

BACKGROUND OF THE INVENTION

1. Field of the Invention

The present invention relates generally to a mobile communication terminal having two or more processing modules to support two or more modes, and in particular, to a handover control device and method for, when a traffic handover occurs, reducing time delay resulting from the traffic handover and enhancing a handover success rate.

2. Description of the Related Art

A mobile communication network is being evolved from a code division multiple access (CDMA) network for a second-generation mobile communication service to a wideband code division multiple access (WCDMA) network for a third-generation mobile communication service. The coverage area of the WCDMA network is also expanding; in general, a WCDMA service area is less than a CDMA service area. Therefore, a mobile communication terminal supporting a WCDMA service is being manufactured as a multi mode terminal that can support even a conventional second-generation CDMA service, and has a function of idle handover capable of mutually switching two WCDMA and CDMA modes.

The idle handover function is a function switching operation occurring in a standby state. If a user communicating in the WCDMA mode at a service area providing all WCDMA and CDMA services enters a shadow area providing only the CDMA service without the WCDMA service, communications are cut off, and then, the standby state is switched into the CDMA mode. Such a communication cutoff causes a great inconvenience for the multi-mode user.

In order to avoid the communication cut of a first method eliminates all WCDMA shadow areas by installing additional WCDMA base stations, at a high cost and over a long period of time. A second method performs a traffic handover using a conventional CDMA network, in which, when the user enters the WCDMA shadow area while communicating, a terminal receives a signal from a base station and switches without cutoff, to the CDMA mode. This method is simple and inexpensive in theory, but since the terminal needs to perform handover between mutually different modems, it gets complex and expensive in its hardware and software implementation.

Figure 1:
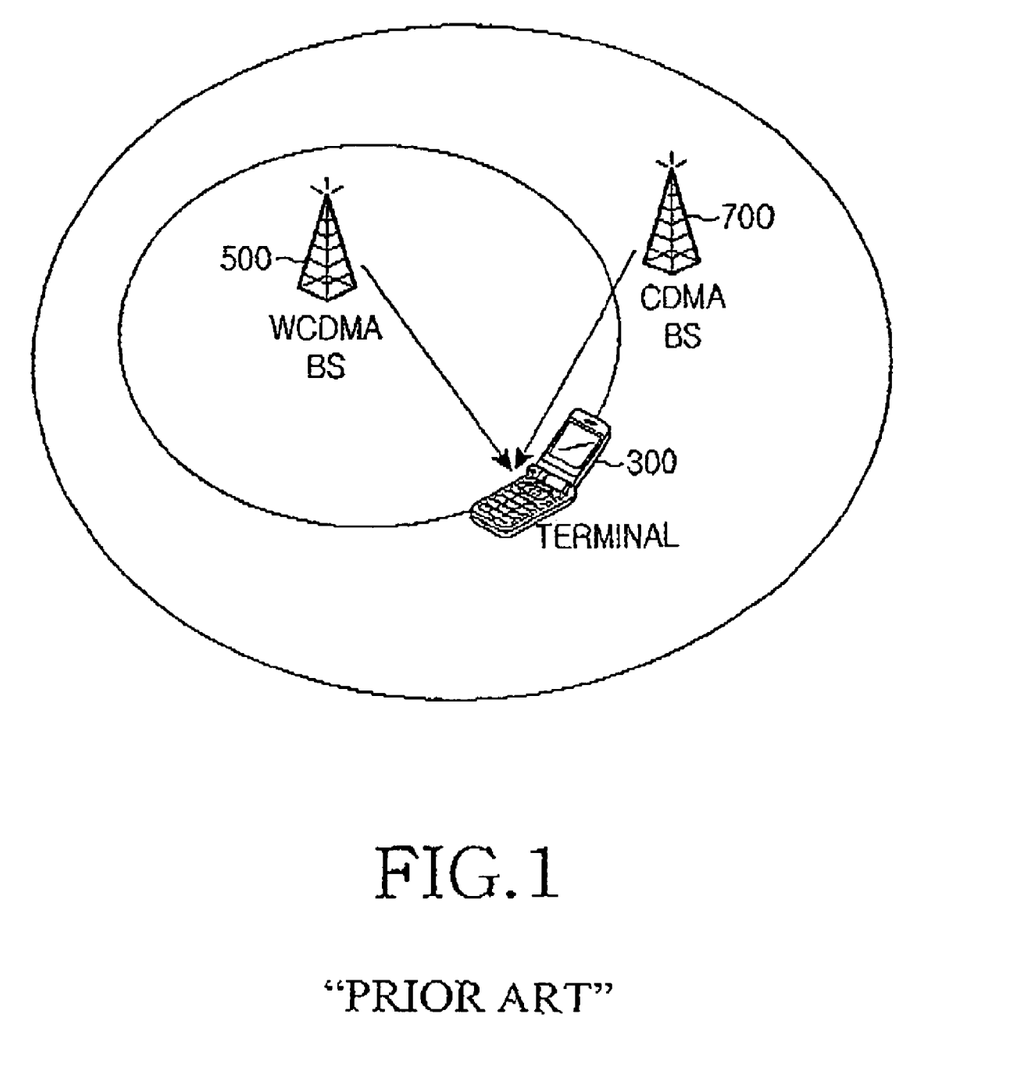
FIG. 1 illustrates a state in which a handover from a WCDMA mode to a CDMA mode occurs.

FIG. 1 illustrates a state in which the handover from the WCDMA mode to the CDMA mode occurs.

Reference numeral 300 denotes a dual-mode mobile communication terminal supporting not only a WCDMA mode but also a CDMA mode. Reference numeral 500 denotes a WCDMA base station in service, and reference numeral 700 denotes an adjacent CDMA base station.

The mobile communication terminal 300 is mobile and therefore, can change position. Accordingly, a service providing cell can be changed. In an example illustrating such the state, the mobile communication terminal 300 is positioned at a boundary cell between a WCDMA network and a CDMA network.

Figure 2:
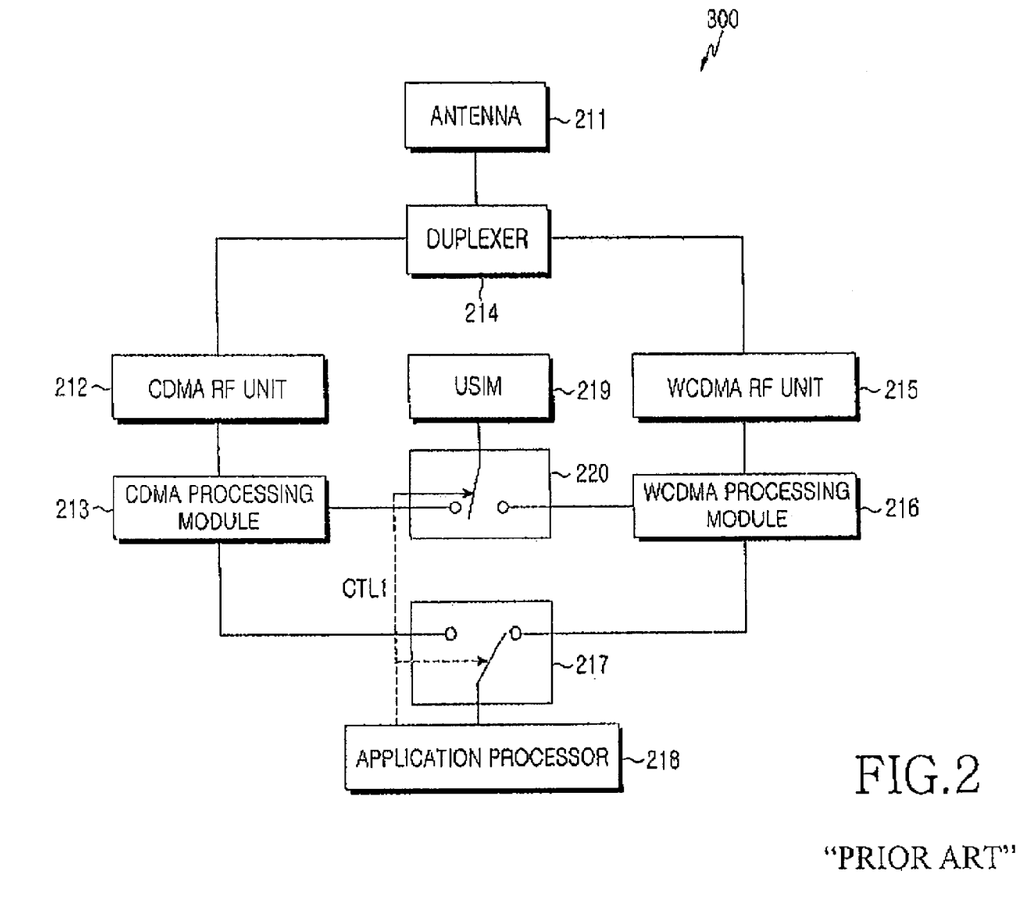
FIG. 2 illustrates a construction of a dual mode mobile communication terminal supporting a WCDMA mode and a COMA mode.

FIG. 2 illustrates a construction of the dual mode mobile communication terminal supporting the WCDMA mode and the CDMA mode.

An antenna 211 receives or transmits a WCDMA signal or a CDMA signal. A CDMA radio frequency (RF) unit 212 transmits or receives the CDMA signal through the antenna 211, and processes the transmission and reception CDMA signal. A CDMA processing module 213 transmits or receives the signal from the CDMA RE unit 212, and processes the transmission or reception signals. The CDMA processing module 213 can be a modem chip or a digital signal processor (DSP) chip. A duplexer 214 receives the WCDMA signal and the CDMA signal through the antenna 211, and separates the received WCDMA and CDMA signals. A WCDMA RF unit 215 transmits or receives the WCDMA signal through the antenna 211, and processes the transmission or reception WCDMA signal. A WCDMA processing module 216 transmits or receives the WCDMA signal from the WCDMA RF unit 215, and processes the transmission or reception signals. Like the CDMA processing module 213, the WCDMA processing module 216 can be a modem chip or a DSP chip.

An application processor 218 is a multimedia chip for processing reception and transmission data.

The WCDMA processing module 216 and the application processor 218 are connected through a hardware inter-chip path, and the COMA processing module 213 and the application processor 218 are also connected through a hardware inter-chip path. In the example shown, a communication port of the application processor 218 is connected with the CDMA processing module 213 or the WCDMA processing module 216 through a first switch 217. The application processor 218 and the respective processing modules correspond with each other on a point-to-point basis through the communication port, and the processing module not used is powered off for the while to prevent power consumption.

A universal subscriber identity module (USIM) 219 has user information. A second switch 220 is to connect the USIM 219 with the CDMA processing module 213 or the WCDMA processing module 216 through a universal asynchronous receiver/transmitter (UART) interface.

The above structure is a case where a dual band dual mode (DBDM) terminal is embodied with a single antenna. When even the DBDM terminal is located at a service area providing only the WCDMA service, the CDMA RF unit 212 and the CDMA processing module 213 are temporarily in off states, and only the other elements 211, 214 to 219 are in on states and therefore, the DBDM terminal is operated like the WCDMA terminal. On the contrary, when the DBDM terminal is located at a service area providing only the COMA service, only the WCDMA RF unit 215 and the WCDMA processing module 216 are temporarily in off states, and only the other elements 211 to 214, and 217 to 219 are in on states and therefore, the DBDM terminal is operated like the CDMA terminal.

Figure 3:
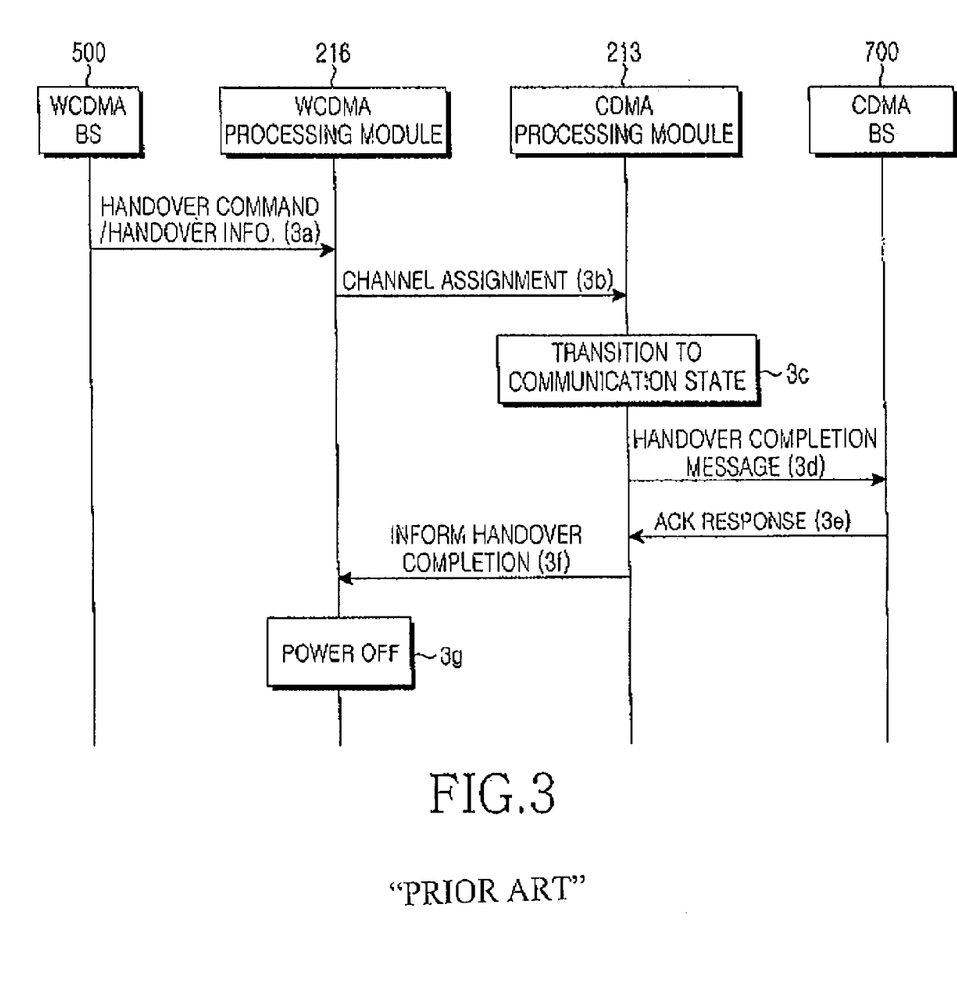
FIG. 3 is a ladder diagram illustrating a traffic handover between a WCDMA mode and a CDMA mode.

FIG. 3 is a ladder diagram illustrating the traffic handover between the WCDMA mode and the CDMA mode.

In order to perform the traffic handover from the WCDMA mode to the CDMA mode, two processing modules need to be concurrently operated to transmit a control signal necessary for the handover. Therefore, if the terminal 300 enters the WCDMA shadow area, the WCDMA base station 500 communicates with the CDMA base station 700, and receives information required for the terminal 300 to perform the handover from the WCDMA mode to the CDMA mode. In other words, in Step 3a, the WCDMA base station 500 commands the WCDMA processing module 216 to perform, the handover, and informs the WCDMA processing module 216 of the information for the handover. At this time, the CDMA processing module 213 is powered on and, in Step 3b, a channel is assigned from the WCDMA processing module 216 to the CDMA processing module 213 through an inter-chip communication.

The CDMA processing module 213 of the terminal 300 reads international mobile subscriber identity (IMSI) information from the USIM 219 and while in an idle state. In Step 3c, the CDMA processing module 213 is switched to be in a communication state, using received channel information, and in Step 3d, transmits a handover completion message to the CDMA base station 500 and informs the COMA base station 500 of the execution of the handover.

In Step 3e, the COMA processing module 213 receives a response message (A ck) from the CDMA base station 700 and, if so, in Step 3f, the CDMA processing module 213 completes the handover and informs the WCDMA processing module 216 of the handover completion through the inter-chip communication.

In Step 3g, upon receipt of an intra-chip command of "handover completion" from the CDMA processing module 213, the WCDMA processing module 216 finishes a handover relating operation and is powered off.

Figure 4:
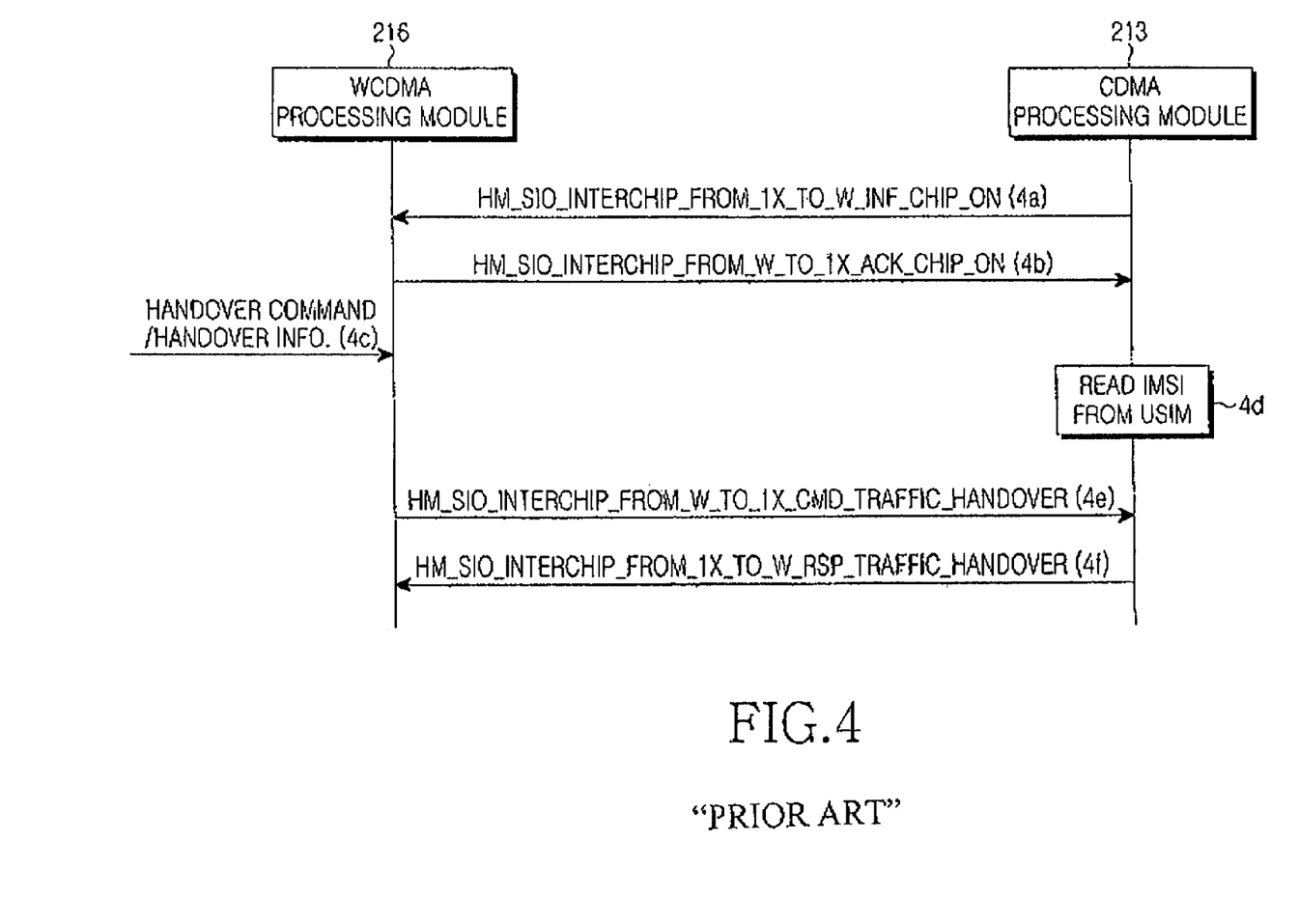
FIG. 4 is a ladder diagram illustrating inter-chip communication for a conventional handover control.

FIG. 4 is a ladder diagram illustrating the inter-chip communication for a conventional handover control.

If the CDMA processing module 213 is powered on at a boundary area, it informs the WCDMA processing module 216 of a power on state of the CDMA processing module 213 through an Inform message (Step 4a). The WCDMA processing module 216 transmits an acknowledge (Ack) message in response to the Inform message to the CDMA processing module 213 (Step 4b). If the WCDMA processing module 216 receives the handover command from the base station (Step 4c), the CDMA processing module 213 is powered on and reads the EVISI information from the USIM 219 (Step 4d). After that, if the WCDMA processing module 216 transmits a message of performing the handover to the CDMA processing module 213 (Step 4e), the CDMA processing module 213 informs the WCDMA processing module 216 of a handover result (Step 4f).

After that, connection of the USIM 219 is again made, and the WCDMA processing module 216 is powered off.

As described above, the multi-mode terminal supporting the WCDMA and CDMA modes uses the separate modem chip. In the WCDMA mode, the USIM 219 having the user information is connected with the WCDMA processing module 216. The WCDMA processing module 216 receiving the handover command and the handover information transmits CDMA channel information to the CDMA processing module 213, and connects the USIM 219 to the CDMA processing module 213 through the switch. However, since the CDMA processing module 213 is powered on and then, is first connected with the USIM 219, it transitions to the idle state after reading the IMSI information from the USIM 219. The idle state transitions to the communication state using the channel information. However, since the handover is delayed for the time needed to receive the IMSI information from the USIM 219 through the UART, the handover can fail due to an excess of a handover allowable time of a CDMA standard depending on a network condition.

SUMMARY OF THE INVENTION

It is, therefore, an object of the present invention to provide a device and method for when a traffic handover from a first network communication mode to a second network communication mode occurs in a dual mode mobile communication terminal, receiving IMSI information even without connecting a USIM in the second network communication mode, thereby reducing a handover time and enhancing a handover success rate.

To achieve the above and other objects, there is provided a device for controlling a traffic handover in a multi-mode mobile communication terminal having a processing module for each mode, the device including a first processing module; a second processing module connected in its inter-chip path with the first processing module; and an application processor for, when a traffic handover event from a first mode to a second mode occurs, controlling the first processing module to transmit an IMSI (international mobile subscriber identity) to the second processing module.

In another aspect of the present invention, there is provided a method for controlling, a traffic handover in a multi-mode mobile communication terminal having a processing module for each mode, the method including the steps of when a first processing module is powered on in a boundary area, informing a second processing module of a power on state of the first processing module, and responding to the informing of the power on state in the second processing module; in the first processing module, receiving an IMSI (international mobile subscriber identity) from the second processing module and responding to the received IMSI; in the second processing module, upon receipt of a handover command from a base station, commanding the first processing module to perform the handover; and in the first processing module, performing the handover using the previously received IMSI, and informing the second processing module of a handover result.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

Hereinafter, a description will be made on the assumption that a first mode is a wideband code division multiple access (WCDMA) mode and a second mode is a code division multiple access (CDMA) mode, and that a mobile communication terminal includes separate processing modules (modems) for supporting the respective modes.

Figure 7:
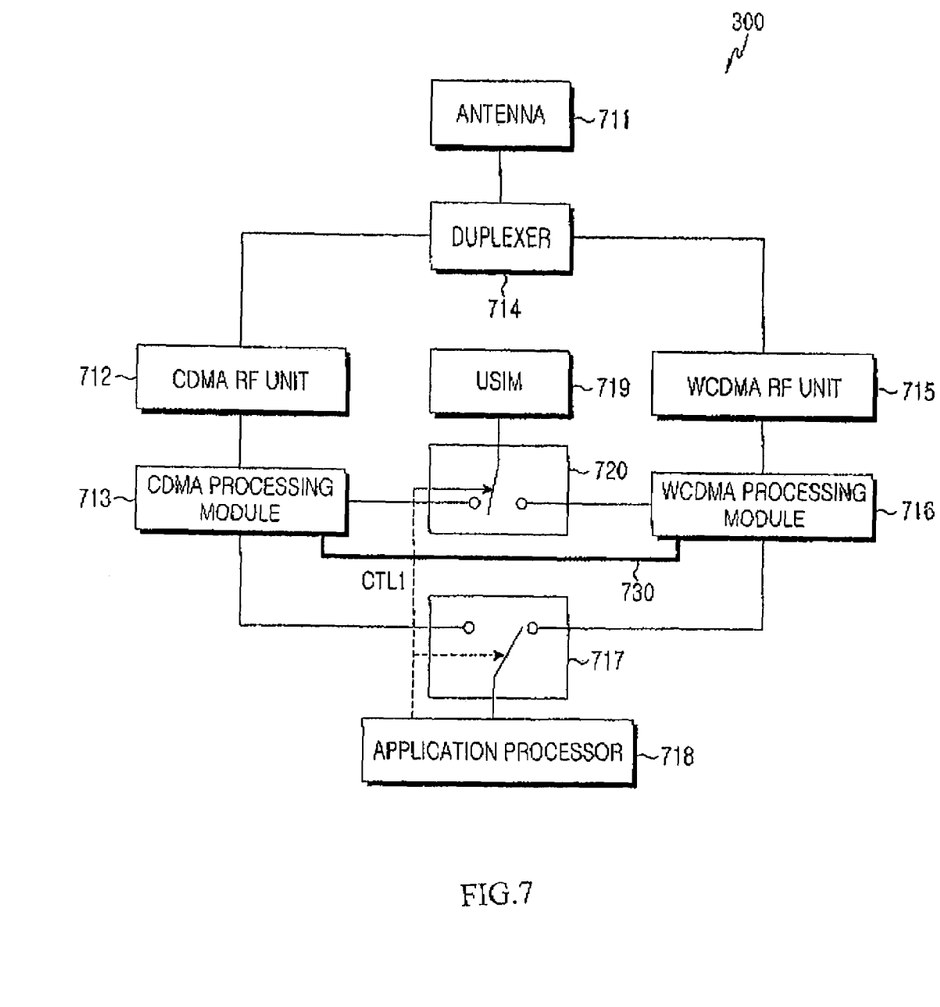
FIG. 7 illustrates a construction of a dual mode mobile communication terminal supporting a WCDMA mode and a COMA mode according to the present invention.

FIG. 7 illustrates a construction of a dual mode mobile communication terminal supporting a WCDMA mode and a CDMA mode according to the present invention.

Referring to FIG. 7, the inventive terminal has a hardware construction similar to that shown in FIG. 2. However, as shown in FIG. 7, the terminal further has a feature in that when a traffic handover event from the WCDMA mode to the CDMA mode occurs, a WCDMA processing module 716 transmits an international mobile subscriber identity (IMSI) to a CDMA. processing module 713 through an inter-chip path 730 connected between the WCDMA and CDMA processing modules 716 and 713.

The WCDMA processing module 716 reads and holds UMSI information from a universal subscriber identity module (USIM) 719 after booting. Therefore, since the CDMA processing module 713 is also powered on at the time of the occurrence of the handover, the WCDMA processing module 716 can transmit the IMSI to the CDMA processing module 713 through the inter-chip path 730 even though an application processor 718 and the WCDMA processing module 716 are connected and operated.

Figure 5:
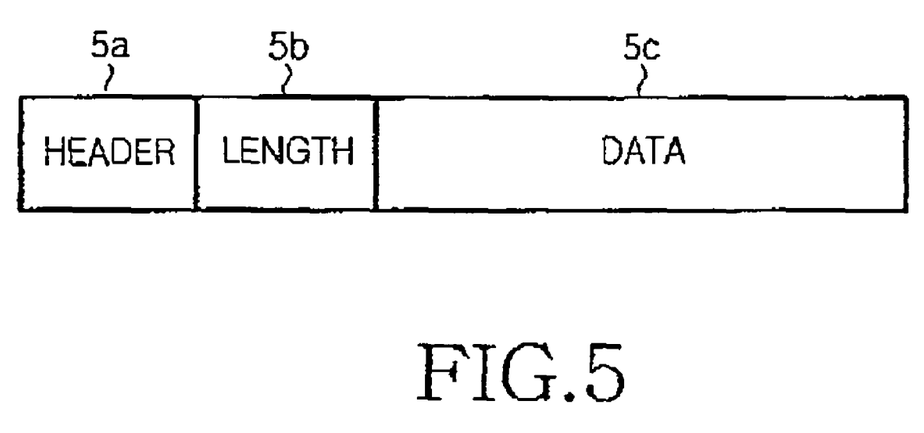
FIG. 5 illustrates an inter-chip communication packet structure according to the present invention.

FIG. 5 illustrates an inter-chip communication packet structure according to the present invention.

For communication between two processing modules (for example, a CDMA modem chip and a WCDMA modem chip), a simple protocol is defined. For future extensibility, the packet structure consists of a header and data, and transmitting a variety of information is used.

The header 5a denotes a kind of a packet. The header 5a has a length of one byte, and can transmit a maximum of 255 kinds of messages. The data 5c denotes data based on the message. Length 5b represents a length of the data. The data length is variable, and is limited to a maximum of 65,535 bytes.

The message transmitted between the chips using the packet is mainly defined as four messages below.

Message of informing another chip of a self chip state: INF (Inform)

Message of responding to INT: ACK (Acknowledge)

Message of commanding from one chip to another chip: CMD (Command)

Message of transmitting command result: RSP (Response)

In order to take Echo information of the CDMA processing module 713 when the handover occurs, the header of the message communicated between the WCDMA and CDMA processing modules 716 and 713 is as follows.

```
typedef enum
  {
    HM_SIO_INTER-CHIP_FROM_W_TO_1X_ACK_CHIP_ON,
/* Message responding to reception message of power-on of CDMA processing
module */
    HM_SIO_INTER-CHIP_FROM_W_TO_1X_CMD_TRAFFIC_HANDOVER,
/* Message of performing handover to CDMA processing module */
    HM_SIO_INTER-CHIP_FROM_W_TO_1X_INF_IMSI,
/* Message of informing CDMA processing module of IMSI information */
  } hm_sio_inter-chip_from_w_to_1x_pkt_type;
typedef enum
  {
    HM_SIO_INTER-CHIP_FROM_1X_TO_W_INF_CHIP_ON,
/* Message of informing WCDMA processing module of power-on of 1X
processing module */
    HM_SIO_INTER-CHIP_FROM_1X_TO_W_RSP_IMSI,
/* Message of receiving and transmitting IMSI information to WCDMA
processing module */
    HM_SIO_INTER-CHIP_FROM_1X_TO_W_RSP_TRAFFIC_HANDOVER,
/* Message of informing WCDMA processing module of handover result */
  } hm_sio_inter-chip_from_1x_to_w_pkt_type;
```

Figure 6:
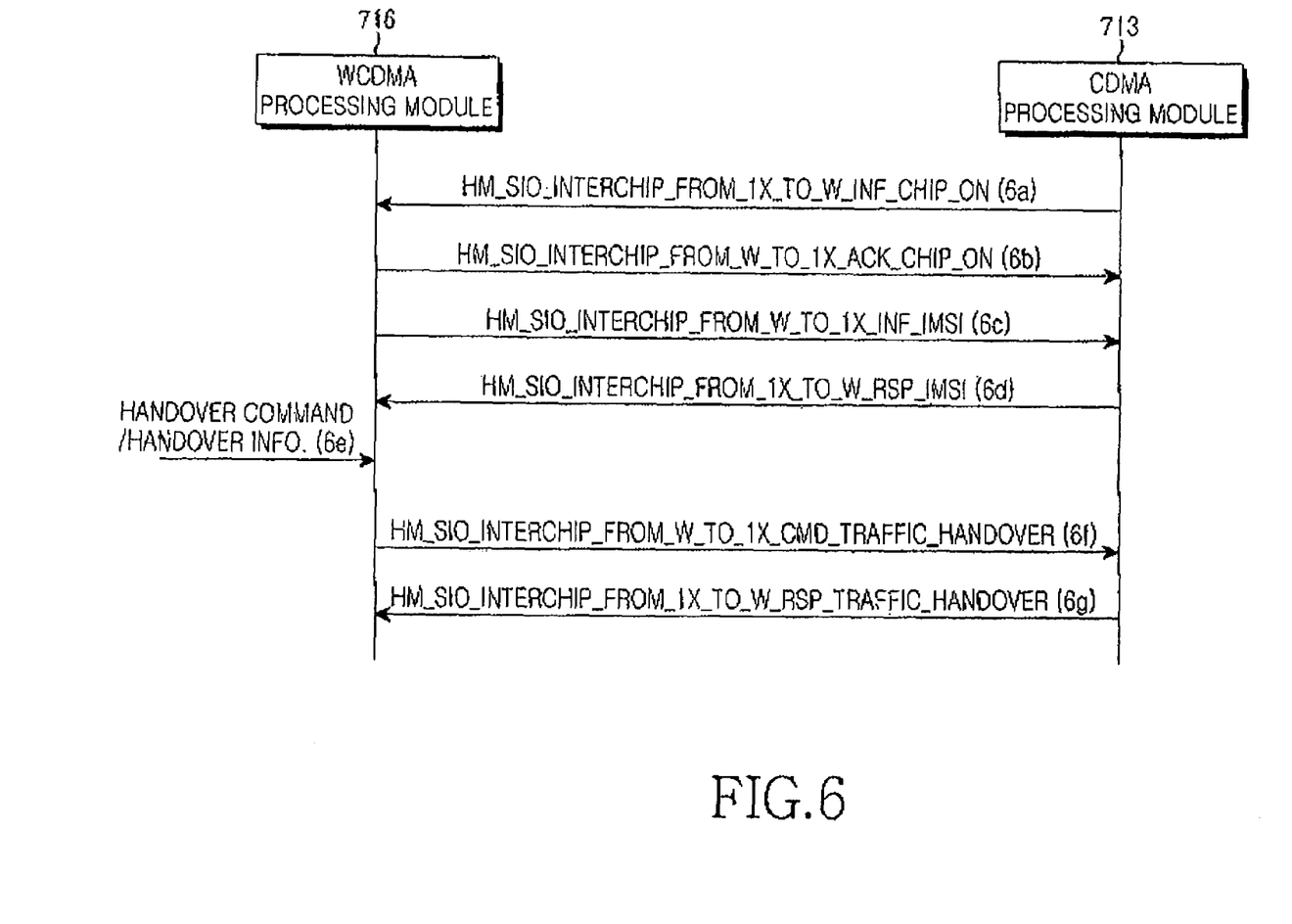
FIG. 6 is a ladder diagram illustrating inter-chip communication for handover control according to the present invention.

FIG. 6 is a ladder diagram illustrating inter-chip communication for handover control according to the present invention.

If the traffic terminal enters a boundary area in the WCDMA mode, the CDMA processing module 713 is powered on and prepares for the occurrence of the handover. After that, if the terminal is out of the boundary area, the WCDMA processing module 716 receives a command for handover to CDMA and handover information (handover from UTRAN command) from a WCDMA base station (Step 6e).

A difference from a conventional method is that, if the CDMA processing module 713 is powered on and then, informs the WCDMA processing module 716 of its power on state, the WCDMA processing module 716 transmits the IMSI information to the CDMA processing module 713. By this, when the CDMA processing module 713 actually receives the handover message, a process of reading the IMSI from the USIM 719 is omitted, and the handover can be directly performed. If the handover succeeds, the WCDMA processing module 716 is informed of the handover success and, before the WCDMA processing module 716 is powered off, a second switch 720 is switched such that the USIM 719 is disconnected from the WCDMA processing module 716 and is connected to the CDMA processing module 713.

A detailed description of a process of transmitting the IMSI information to the CDMA processing module 713 through the inter-chip communication will be made as follows.

If the COMA processing module 713 is powered on at the boundary area, it informs the WCDMA processing module 716 of its power on state through the Inform message (Step 6a). The WCDMA processing module 716 transmits the Ack message for the Inform message to the CDMA processing module 713 (Step 6b). The WCDMA processing module 716 transmits the IMST information to the CDMA processing module 713 (Step 6c). The CDMA processing module 713 receives the IMSI and transmits the Response message to the WCDMA processing module 716 (Step 6d). Upon receipt of the handover command from the base station (Step 6e), the WCDMA processing module 716 transmits the handover execution message to the COMA processing module 713 (Step 6f). The CDMA processing module 713 informs the WCDMA processing module 716 of the handover result (Step 6g).

After that, connection of the USIM 719 is made, and the WCDMA processing module 716 is powered off.

The present invention differs from the prior art as shown in FIG. 4, since after receipt of the handover command, the MASI is read from the USIM 719 and then the handover is performed (in other words, the reading of the IMSI from the USIM 719 is omitted), as shown in FIG. 6, the IMSI previously received from the WCDMA processing module 716 is used, thereby reducing a handover delay time as much.

As described above, the present invention has an advantage in that, when the traffic handover is performed in the multi-mode terminal, a handover processing time is not only reduced but also a handover success rate can be enhanced.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A device for controlling a traffic handover in a multi-mode mobile communication terminal having a separate processing module for each mode, the device comprising:
   a first processing module;
   a second processing module; and
   an application processor for controlling the first processing module to transmit an International Mobile Subscriber Identity (IMSI) directly to the second processing module when a traffic handover event from a first mode to a second mode occurs,
   wherein the first processing module and the second processing module arc connected through an inter-chip path,
   wherein the first processing module receives a command for handover to the second mode and handover information from a first base station after the first processing module transmits the IMSI to the second processing module,
   when a traffic handover event from the first mode to the second mode occurs, the second processing module directly performs the handover command using the IMSI previously received from the first processing module.

2. The device of claim 1, wherein the first mode is a Wideband Code Division Multiple Access (WCDMA) mode, and the second mode is a Code Division Multiple Access (CDMA) mode.

3. The device of claim 1, wherein the first mode is a Code Division Multiple Access (CDMA) mode, and the second mode is a Wideband Code Division Multiple Access (WCDMA) mode.

4. A method for controlling a traffic handover in a multi-mode mobile communication terminal having a separate processing module for each mode, the method comprising the steps of:
   when a first processing module is powered on in a boundary area, informing a second processing module of a power on state of the first processing module, and responding to the informing of the power on state by the second processing module;
   receiving, by the first processing module, an International Mobile Subscriber Identity (IMSI) directly from the second processing module through an inter-chip path and responding to the received IMSI;
   upon receipt of a handover command from a base station, commanding, by the second processing module, the first processing module to perform the handover; and
   performing, by the first processing module, the handover using the previously received IMSI, and informing the second processing module of a handover result,
   wherein the handover command is performed after the first processing module receives the IMSI from the second processing module.

5. The method of claim 4, further comprising powering off the second processing module receiving the handover result.

6. The method of claim 4, wherein a first mode is a Wideband Code Division Multiple Access (WCDMA) mode, and a second mode is a Code Division Multiple Access (CDMA) mode.

7. The method of claim 5, wherein a first mode is a Wideband Code Division Multiple Access (WCDMA) mode, and a second mode is a Code Division Multiple Access (CDMA) mode.

8. The method of claim 4, wherein a first mode is a Code Division Multiple Access (CDMA) mode, and a second mode is a Wideband Code Division Multiple Access (WCDMA) mode.

9. The method of claim 5, wherein a first mode is a Code Division Multiple Access (CDMA) mode, and a second mode is a Wideband Code Division Multiple Access (WCDMA) mode.

* * * * *